July 3, 1934.　　　J. L. DRAKE　　　1,965,114
PRESSING APPARATUS
Filed Oct. 19, 1931　　　2 Sheets-Sheet 1
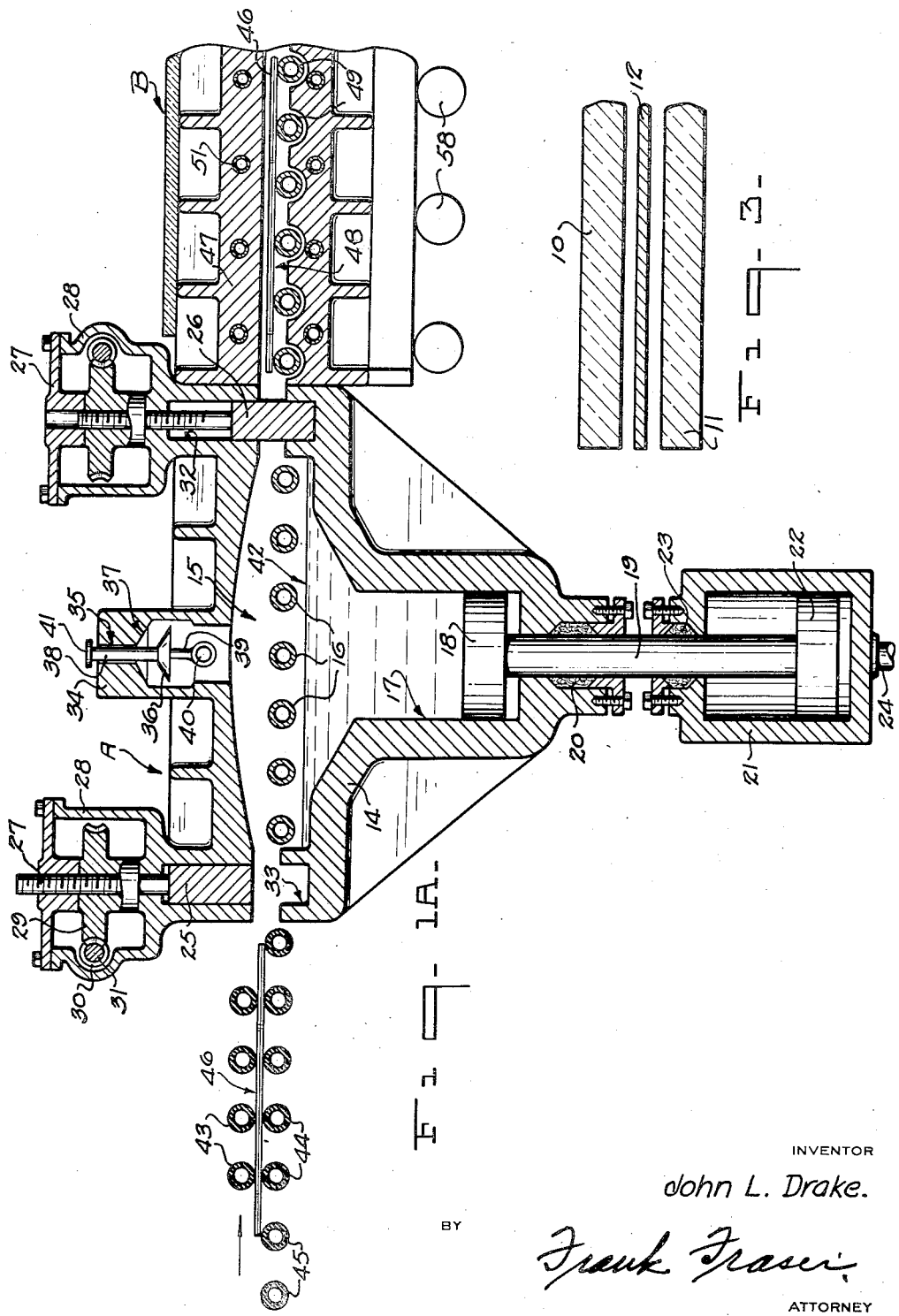

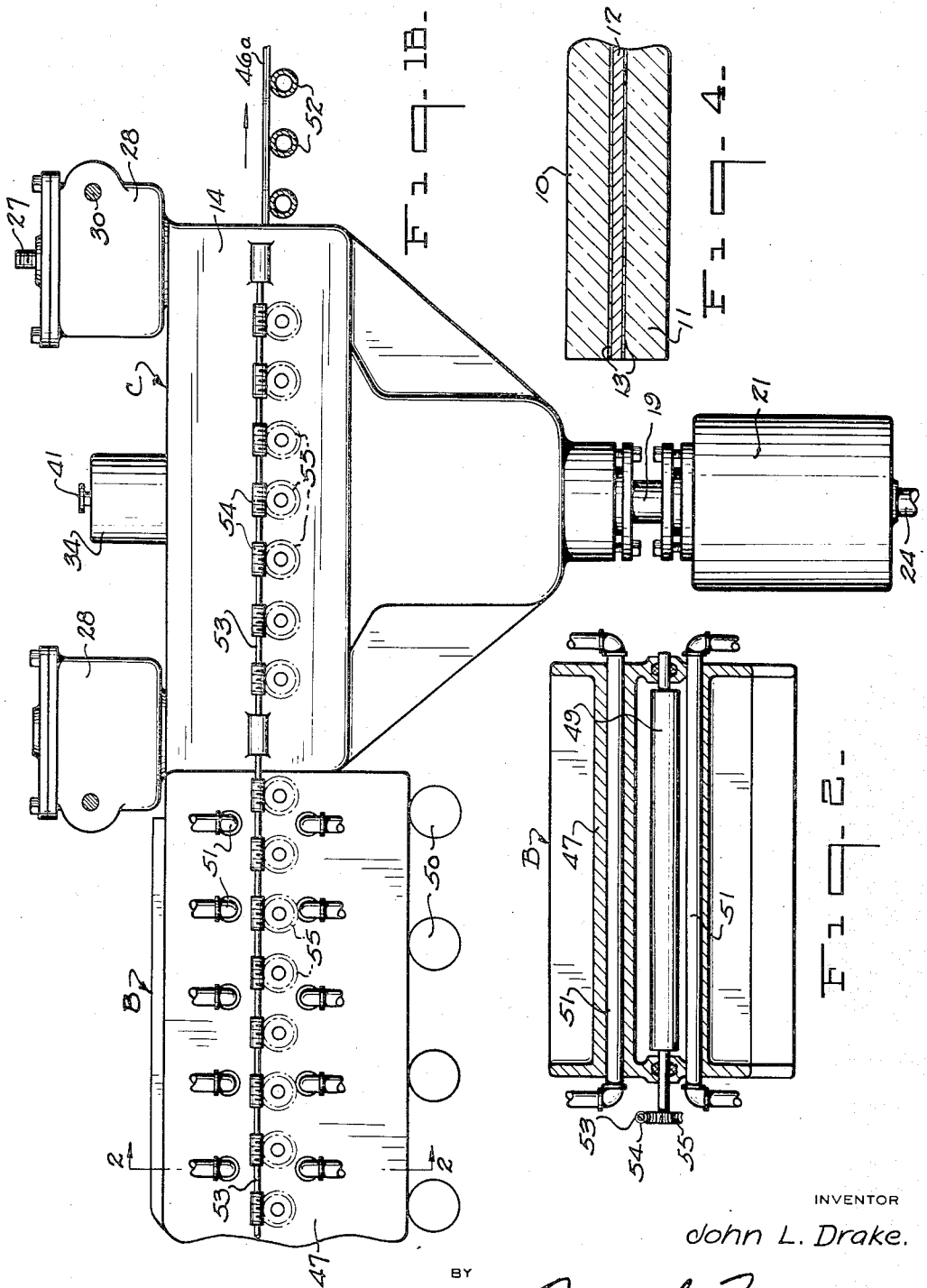

Patented July 3, 1934

1,965,114

UNITED STATES PATENT OFFICE 1,965,114

PRESSING APPARATUS

John L. Drake, Toledo, Ohio, assignor to Libbey-Owens-Ford Glass Company, Toledo, Ohio, a corporation of Ohio Application October 19, 1931, Serial No. 569,661

12 Claims. (Cl. 18—17)

The present invention relates broadly to pressing apparatus and more particularly to an improved apparatus of this character adapted primarily for use in the manufacture of laminated or composite glass.

The expression "laminated glass" is used to designate a composite structure ordinarily consisting of two sheets of glass with an interposed plastic membrane, all united together to form a composite structure. It is the usual practice to subject the properly treated laminations to the combined action of heat and pressure in order to obtain the desired bond therebetween.

The principal aim and object of this invention is to provide an improved type of pressing apparatus by the use of which the several sheets or laminations can be properly joined together to form a unitary structure in a satisfactory and economical manner.

Another important object of the invention is to provide such an apparatus of this character wherein fluid pressure is employed as the pressing medium, and wherein the application of this pressure may be so controlled and the assembled laminations so handled that a substantially continuous flow of production may be had.

Another object of the invention is to provide an apparatus of the character above described embodying a series of compartments or chambers through which the assembled laminations may be moved and subjected to the desired temperature and pressure to bond the said laminations together, the construction and operation of the apparatus being such that the loading of the assembled laminations into the apparatus and the unloading of the finished composite sheets therefrom may be accomplished without interrupting the pressing operation whereby a material saving in time and expense is effected.

Other objects and advantages of the invention will become more apparent during the course of the following description when taken in connection with the accompanying drawings.

In the drawings forming a part of this application and wherein like numerals are employed to designate like parts throughout the same, Fig. 1A is a vertical longitudinal section through the forward end of the pressing apparatus provided by the present invention, Fig. 1B is a side elevation of the rear end portion thereof, Fig. 2 is a section taken substantially on line 2—2 of Fig. 1B, Fig. 3 is a sectional view of the several laminations to be joined, shown in properly assembled relationship but spaced from one another, and Fig. 4 is a sectional view of a portion of the finished laminated sheet subsequent to pressing.

As has already been pointed out, laminated glass is ordinarily formed of two or more sheets of glass and one or more plastic membranes interposed therebetween and united thereto. Referring first to Figs. 3 and 4 the numerals 10 and 11 designate two sheets of glass between which is arranged a plastic membrane 12 ordinarily consisting of a sheet of suitable non-brittle material. In practice, the several laminations are first assembled in proper superimposed relationship and then subjected to the combined action of heat and pressure to produce a composite structure. Prior to assembling, the surfaces of one or all of the laminations to be joined may be treated with a suitable bonding or bond-inducing medium 13. The present invention is of course in no way limited to the particular ingredients or process used in the manufacture of the laminated glass per se but, on the other hand, relates to an improved apparatus for effecting the pressing together of the laminations after they have been treated in the desired manner and arranged in proper superimposed relationship.

The pressing apparatus herein provided may be termed a station autoclave and, broadly speaking, consists of a series of compartments or chambers through which the assembled sets of sheets or sandwiches may be moved and subjected to the desired temperature and pressure to bond the several laminations together, a suitable fluid being used in the autoclave as the pressing medium. The construction and operation of the station autoclave is such that the sandwiches may be introduced into a compartment adapted to contain a fluid under pressure in such a manner that the conditions in said compartment are not materially changed, the sandwiches being subjected while in this compartment to the desired temperature, pressure etc. and then removed therefrom to make room for following sandwiches, the said sandwiches being moved from station to station in a substantially continuous manner as will more fully hereinafter appear.

Referring now more particularly to Figs. 1A and 1B, the station autoclave herein provided may be said to consist of three principal stations or sections A, B and C, of which A constitutes the loading section or station, B the heating and pressing section or station, and C the unloading section or station. In Fig. 1A the loading section has been shown in section, while in Fig. 1B the unloading section has been shown in elevation. However, insamuch as both the loading and unloading sections are of substantially the same construction, a detailed description of one will, it is believed, suffice for both. Thus, the loading and unloading sections A and C respectively each comprises a housing 14 having formed therein a compartment or chamber 15 within which is arranged a series of horizontally aligned rolls 16 adapted to receive the assembled laminations to be joined thereupon and being journaled within the side walls of said housing. The compartment 15 is formed with a centrally disposed well 17 within which is slidable a plunger 18 carried at the upper end of a vertical piston rod 19, said rod passing downwardly through a stuffing box 20 at the lower end of said housing and carrying a piston 22 operating within the cylinder 21. The cylinder 21 also carries a stuffing box 23 through which the piston rod passes, and associated with the bottom of said cylinder is a pipe connection 24 leading to a suitable source of compressed air.

Positioned at opposite ends of the housing 14 are the vertically adjustable gate valves 25 and 26, each being carried at each end thereof by a vertical screw 27 passing upwardly through a casing 28 and having threaded thereupon a worm gear 29 meshing with and driven from a worm 30 carried by shaft 31. The gears 29 are mounted within casings 28 for non-vertical movement so that, upon rotation thereof, the screws 27 will be threaded upwardly or downwardly therethrough to raise or lower the respective gate valve 25 or 26. Each gate valve, when in its open position, is received within a recess 32 in the housing and, when closed, the upper end is received within this recess and the lower end within a recess 33 so as to completely close the opening leading into the housing.

The top of the housing 14 is formed centrally thereof with a dome 34 provided with a vertical opening 35 extending therethrough. Received within the dome is a float valve 36 which, upon vertical movement, is adapted to engage the valve seat 37 so as to close the opening 35. The float valve 36 is carried at the lower end of a sleeve 38 slidably mounted upon a vertical pin 39 secured to the housing as at 40, the upper end of sleeve 38 being provided with a head 41 to limit downward movement of valve 36.

It is preferred that some suitable fluid be used in the autoclave as the pressing medium and, by way of example, it is mentioned that carbitol can be employed. A supply of carbitol or other fluid is contained within the housing 14 of the loading section A as well as in the unloading section C at all times. However, during the feeding of the work into the compartment 15 of loading section A, the plunger 18 is retracted so that the level of the fluid will be beneath the rolls 16 as is indicated at 42, and likewise when delivering the finished composite sheet from the unloading section C, the level of the fluid therein will be beneath the respective rolls 16.

With some processes of producing laminated glass, it will be desirable to subject the assembled laminations to a so-called preliminary pressing operation before the sandwich thus formed is passed into the autoclave. This is necessary in order to prevent the pressing fluid within the autoclave from working its way in between the laminations during the pressing operation. To accomplish this preliminary pressing or closing up of the sandwiches, there may be positioned in advance of the loading section A, a plurality of pairs of superimposed rolls 43 and 44, said rolls being preferably constructed of some suitable resilient material such as hard rubber or the like, with the lower rolls 44 being in horizontal alignment with the rolls 16. There may be provided in advance of the pairs of rolls 43 and 44 a number of additional rolls 45 upon which the assembled laminations are first placed.

In the operation of the autoclave as thus far described, the sandwich 46 formed of the several laminations to be joined is first placed upon the rolls 45 and then passed between the pairs of rolls 43 and 44 which serve to effect a preliminary pressing thereof such as will prevent the entrance of the pressing fluid between the laminations after the sandwich is fed into the autoclave. The gate valve 25 of the loading section A is then opened while the gate valve 26 thereof is closed, and the piston 18 retracted so that the level of the pressing fluid will fall beneath the rolls 16. The sandwich 46 is then fed into the compartment 15 wherein it is supported upon the rolls 16. The valve 25 is then closed, after which compressed air is forced into the cylinder 21 through pipe connection 24, and this air acting upon the bottom of piston 22, will force the same, together with the piston rod 19 and plunger 18, upwardly. The raising of plunger 18 causes a displacement of the carbitol or other pressing fluid, forcing the air within the compartment 15 upwardly through the opening 35 in the dome 34. When the fluid reaches the float valve 36, the said valve will be raised upwardly, thereby closing the opening 35, after which the desired pressure may be built up within the compartment 15. After the desired pressure has been built up within the compartment, the gate valve 26 is opened and the sandwich passed into the heating and pressing section B. The gate valve 26 is then closed and the plunger 18 retracted, thereby allowing the fluid level to lower and the float valve 36 to open. The gate valve 25 is then again opened and the loading section is ready for the next sandwich.

The heating and pressing section B may be made of sufficient length to accommodate any desired number of sandwiches 46. This section also consists of an elongated housing 47 substantially rectangular in cross section, and being provided therein with a longitudinally extending compartment or chamber 48 within which the sandwiches are received from the loading compartment 15 upon opening of valve 26 as previously described. The sandwiches are received and carried through the heating and pressing compartment 48 upon a series of horizontally arranged rolls 49 positioned in alignment with the rolls 16 in the loading and unloading sections. The housing 47 may also be suitably insulated as desired and is preferably mounted on a series of rollers 50 to permit of the desired expansion.

The heating and pressing compartment 48 is also adapted to contain a fluid under pressure and, as a matter of fact, under normal operating conditions the fluid within compartment 48 is adapted to be maintained at substantially the same pressure at all times, the apparatus being such that the sandwiches may be passed into and removed from this compartment without materially changing or affecting the characteristics of the fluid therein. The heating of the fluid within compartment 48 may be effected in any suitable manner such as by the provision of a plurality of steam pipes 51 extending transversely through the housing 47 above and beneath the compartment 48.

Referring again to the loading section A, it has already been pointed out that when the gate valves 25 and 26 have been closed, the fluid such as carbitol is placed under pressure in the compartment 15, and it is preferred that the pressure of the fluid within said compartment be brought up to a pressure substantially the same as the pressure of the fluid in the heating and pressing compartment 48 so that, upon opening of gate valve 26, the pressures in the two compartments will be substantially the same whereupon the sandwich may be passed from the loading compartment 15 into the heating compartment 48 without materially affecting the temperature and pressure within the latter compartment. Consequently, substantially predetermined conditions, particularly as regards temperature and pressure, may be maintained within compartment 48 and the fluid therein need not be alternately heated and cooled but, on the other hand, can be kept within a given temperature range.

When it is desired to pass the sandwich from the heating and pressing compartment 48 into the compartment 15 of the unloading section C, the gate valve 25 of the unloading section will be closed, and a fluid pressure built up within the compartment 15 thereof in the same manner as above described in reference to loading section A. When the fluid is under a pressure substantially the same as the pressure within compartment 48, the gate valve 26 leading into the unloading section may be opened and the sandwich passed into the unloading compartment 15. The gate valve 26 is then closed, the piston 19 retracted so as to relieve the pressure within the compartment, and the gate valve 25 then opened, whereupon the sandwich can be delivered from the unloading section onto a series of conveying rolls 52.

The rolls 16 in the loading and unloading sections A and C, together with the rolls 49 in the heating and pressing section B, are adapted to be driven in unison from a common drive means, and to this end there may be arranged longitudinally of the autoclave at one side thereof a line shaft 53 carrying a plurality of worms 54, one being provided for and adapted to mesh with a worm gear 55 carried at the adjacent end of each of the above-mentioned rolls. The line shaft 53 may be driven in any desired manner so that all of the rolls will be driven simultaneously in the same direction and at a uniform speed. In practice, as one sandwich is being fed into the loading section A, another sandwich is being passed from the pressing and heating section B into the unloading section C. Although the sandwiches are actually passed through the autoclave in a step by step fashion, yet the movement is substantially continuous so that a substantially continuous flow of production may be had.

With the station autoclave above described, it is possible to load and unload the same without interfering with the pressing operation within compartment 48. Also, the autoclave herein provided is relatively simple in construction and operation and permits of an economical production of laminated glass in a substantially continuous manner. Likewise, with the type of autoclave shown, it is at no time necessary to remove the pressing fluid from any one of the compartments so that the disadvantages incident to pumping the fluid alternately into and out of the compartments between each pressing operation are avoided.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for the manufacture of laminated sheet glass, an autoclave comprising a plurality of chambers, conveying means arranged within said chambers for supporting and carrying the sheets to be united therethrough, means for placing fluid under pressure within the chambers, and means operable so that the sheets to be united may be transferred from one chamber to the other without materially affecting the pressure of the fluid in the respective chambers.

2. In an apparatus for the manufacture of laminated sheet glass, an autoclave comprising a plurality of connecting chambers, roller conveying means arranged within said chambers for supporting and carrying the sheets to be united therethrough, means for separating the chambers from one another, said chambers being adapted to contain fluid under pressure, and means for operating the chamber separating means without materially affecting the fluid under pressure in said chambers.

3. In an apparatus for the manufacture of laminated sheet glass, an autoclave comprising a plurality of connected sections, each section having a chamber therein, with all of said chambers being in communication with one another, a plurality of rolls arranged within the chambers for supporting and carrying the sheets to be united therethrough, means for separating the chambers from one another, said chambers being adapted to contain fluid under pressure, and means for operating the chamber separating means without materially affecting the fluid under pressure in said chambers.

4. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, conveying means arranged within the chambers for supporting and carrying the sheets to be united therethrough, said intermediate chamber being adapted to contain a fluid under pressure, means for placing fluid under pressure in said loading and unloading chambers, and means operable so that the sheets to be united may be transferred from the loading chamber into the pressing chamber and from the pressing chamber into the unloading chamber without materially affecting the fluid under pressure in said chambers.

5. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, roller conveying means arranged within the chambers for supporting and carrying the sheets to be pressed therethrough, means for separating the chambers from one another, said intermediate chamber being adapted to contain a fluid under pressure, means for placing fluid under pressure in said loading and unloading chambers, and means for operating the chamber separating means without materially affecting the fluid under pressure in said chambers.

6. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, conveying means arranged within the chambers for supporting and carrying the sheets to be united therethrough, said intermediate chamber being adapted to contain a fluid under pressure, the loading and unloading chambers being also adapted to contain a fluid, means for displacing the fluid in said loading and unloading chambers to build up a desired pressure therein, and means operable so that the sheets to be united may be transferred from the loading chamber into the pressing chamber and from the pressing chamber into the unloading chamber without materially affecting the pressure of the fluid in the respective chambers.

7. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, conveying means arranged within the chambers for supporting and carrying the sheets to be united therethrough, means for separating the chambers from one another, said intermediate chamber being adapted to contain a fluid under pressure, the loading and unloading chambers being also adapted to contain a fluid, means for displacing the fluid in said loading and unloading chambers to build up a desired pressure therein, and means for operating the chamber separating means without materially affecting the fluid under pressure in said chambers.

8. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, roller conveying means arranged within the chambers for supporting and carrying the sheets to be united therethrough, said intermediate chamber being adapted to contain a fluid under pressure, the loading and unloading chambers also being adapted to contain a fluid, plunger means for displacing the fluid in said loading and unloading chambers to build up a desired pressure therein, and means operable so that the sheets to be united may be transferred from the loading chamber into the pressing chamber and from the pressing chamber into the unloading chamber without materially affecting the pressure of the fluid in the respective chambers.

9. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, roller conveying means arranged within the chambers for supporting and carrying the sheets to be united therethrough, means for separating the chambers from one another, said intermediate chamber being adapted to contain a fluid under pressure, the loading and unloading chambers also being adapted to contain a fluid, plunger means for displacing the fluid in said loading and unloading chambers to build up a desired pressure therein, and means for operating the chamber separating means without materially affecting the fluid under pressure in said chambers.

10. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, conveying means arranged within the chambers for supporting and carrying the sheets to be united therethrough, said intermediate chamber being adapted to contain a fluid under pressure, the loading and unloading chambers being also adapted to contain a fluid, and each of said latter chambers being formed with a centrally disposed well, a plunger slidably mounted within said well for displacing the fluid within the respective chamber to build up a desired pressure therein, and means operable so that the sheets to be united may be transferred from the loading chamber into the pressing chamber and from the pressing chamber into the unloading chamber without materially affecting the pressure of the fluid in the respective chambers.

11. In an apparatus for the manufacture of laminated sheet glass, an autoclave comprising a loading section, an unloading section, and an intermediate pressing section positioned between the loading and unloading sections, each of said sections having a chamber therein, with all of said chambers being in communication with one another, roller conveying means arranged within the chambers for supporting and carrying the sheets to be united therethrough, means for separating the chambers from one another, said intermediate chamber being adapted to contain a fluid under pressure, the loading and unloading chambers being also adapted to contain a fluid, and each of said latter chambers being formed with a centrally disposed well, a plunger slidably mounted within said well for displacing the fluid within the respective chamber to build up a desired pressure therein, and means for operating the chamber separating means without materially affecting the fluid under pressure in said chambers.

12. In the process of manufacturing laminated sheet glass comprising two or more sheets of glass and one or more interposed sheets of a non-brittle material, which consists in first assembling the sheets to be joined in proper superimposed relationship to form a sandwich, passing the sandwich horizontally through a plurality of chambers containing a pressing fluid which comes into direct contact with said sandwich, in building up the desired fluid pressure within said chambers, and in maintaining the pressure of the fluid upon the sandwich substantially constant during the forward travel thereof through the chambers and also during its passage from one chamber to the next chamber.

JOHN L. DRAKE.